3,412,551
CONSTANT LENGTH DEVICE IN A CHANGING
TEMPERATURE ENVIRONMENT
George K. Swinzow, Rte. 113A,
East Thetford, Vt. 05043
Filed Dec. 22, 1965, Ser. No. 515,784
4 Claims. (Cl. 58—133)

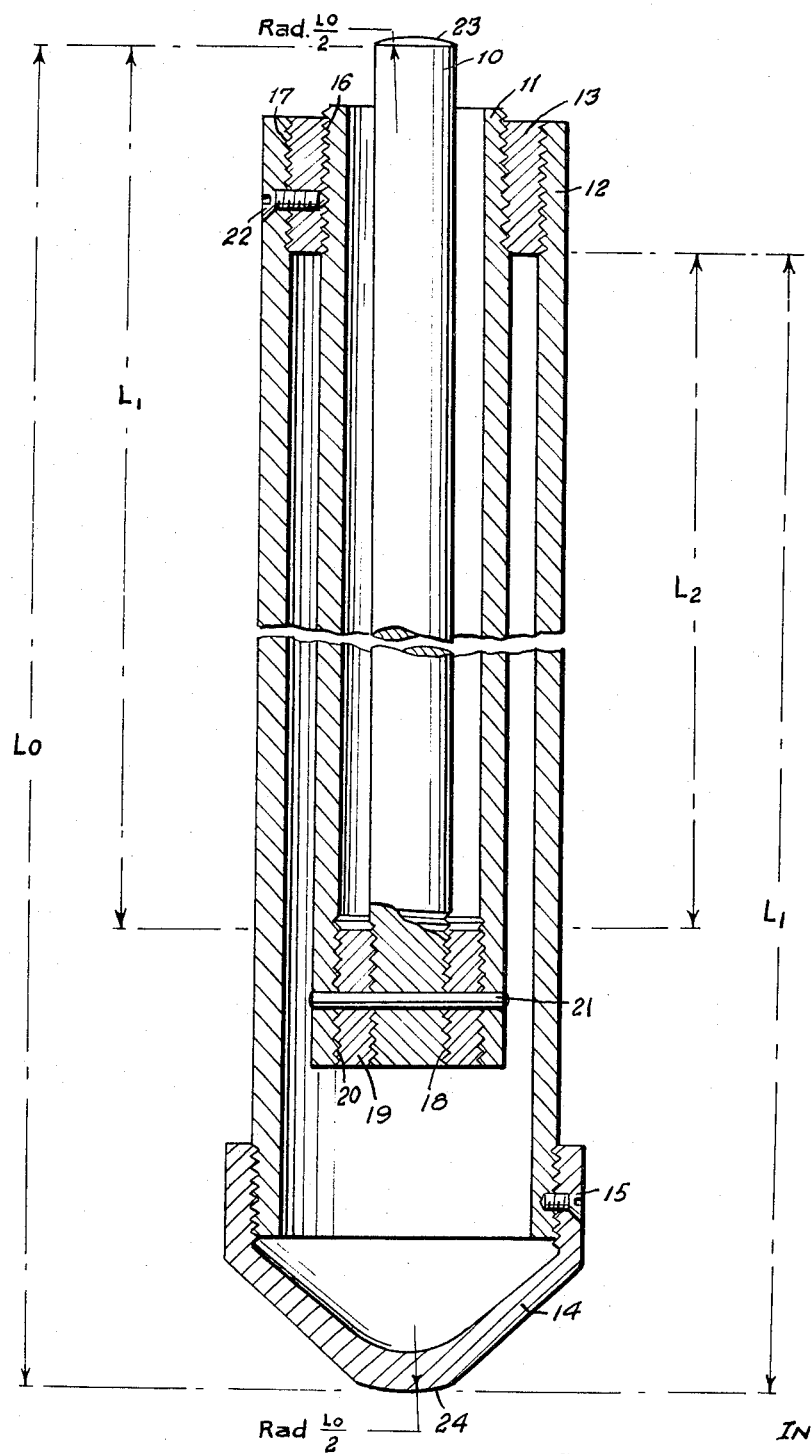

The invention described herein may be manufactured and used by or for the Government for governmental purposes, without the payment to me of any royalty thereon.

This invention relates in general to a body or device which will remain constant in one of its dimensions despite fluctuations in the temperatures of the body or device.

It is well-known that all materials expand or contract in size with a change in temperature. This thermally caused change in size must be taken into consideration in the design and engineering of structures or machines which will be subjected to a fluctuating temperature so as to allow expansion or contraction to occur without damage to the structure or mechanism. While appropriate allowances can be made for temperature-induced dimensional changes in many situations, this phenomena presents a serious problem in connection with so-called precision instruments and equipment where even the slightest change in a dimension of some critical part will appreciably effect the end result. This problem has been dealt with in the past by maintaining the instrument at a given temperature in a constant temperature environment or by adjusting the instrument in some fashion to compensate for each change in its temperature. It is obvious that the foregoing attempts to eliminate or compensate for thermally-induced changes in the dimension of a critical part are at best cumbersome and time-consuming and are limited as to their applicability.

Accordingly, it is an object of the present invention to produce a device or structural part which maintains one dimension constant when exposed to a changing temperature.

It is also an object to produce a device, structural part or component whose lengthwise dimension is constant despite fluctuations in its temperature.

These and other objects of the present invention will become apparent from the following detailed description wherein reference is had to the accompanying drawing in which the single figure is a longitudinal section through a device illustrative of the invention.

Referring to the drawing, there is shown a device which accomplishes the foregoing objects by a unique arrangement of two separate materials which have dissimilar coefficients of linear thermal expansion which coefficient is defined as the ratio of the change in length of a material per degree centigrade to the length at 0° C. The three main parts of this device are a cylindrical steel rod 10, a cylindrical aluminum sleeve 11 and a cylindrical steel tube 12, which parts are held together in a concentric relationship by means of brass bushings. Steel tube 12 has its lower end clamped or closed with a steel cup 14 which has interior threads which mate with exterior threads on the tube 12. A lock screw 15 secures these two parts in a fixed relationship. The aluminum sleeve 11 having external threads 16 at its upper end is suspended within the tube 12 and is held in position by a brass bushing 13 having both inner and outer threads which threadably engage the external threads 16 of the aluminum sleeve and the interior threads 17 of the steel tubing. The remainder of the aluminum sleeve not in contact with the brass bushing 13 in suspended within the steel tube and is so spaced from the walls and end of the tube as to be free to expand in any dimension without restraint. Steel rod 10 equal in length to the steel tube 12 is positioned within the aluminum sleeve and has its upper end extending beyond the upper sleeve 11 and the tube 12. The lower end of the rod 10 is secured to the lower end of the aluminum sleeve. Outer threads 18 of the rod threadably engage a brass bushing 19 having inner and outer threads which bushing in turn threadably engages the inner threads 20 of the aluminum sleeve. Pin 21 is inserted through openings in the sleeve, rod and brass bushing to hold these parts in a fixed immovable relationship.

The materials employed in the construction of the foregoing device and the dimensions of the various parts are so selected as to produce a device or structure that will be dimensionally stable along its longitudinal axis despite changes in the temperature of the device or structure. In general, this is accomplished by causing the dimensional change of one part, the aluminum sleeve, to exactly compensate for the dimensional change of the steel tube and rod. This device will act in the same manner with changes in temperature, whether the change be upward or downward.

The inner sleeve is constructed of a material having a higher coefficient of linear thermal expansion than the other members. This permits the inner sleeve to be shorter than the outer sleeve or rod and also permits the rod to protrude from the unit. Once the sleeve is fixed at both ends by bushings, the overall or effective length subject to change is the distance between the two bushings as indicated by $L_2$ in the drawing. The bushings are formed of a metal, e.g. brass having a coefficient of linear thermal expansion between that of the steel and aluminum materials used in this example.

The numerical solution for determining the lengths of the three components will now be described:

Let:

$L_0$=overall length of the measuring device
$L_1$=effective length of the rod 10 and of the tube 12 with cap
$L_2$=effective length of the aluminum sleeve 11

Then by inspection (see figure)

$$L_0 = L_1 - L_2 + L_1 = 2L_1 - L_2 \quad \text{(Equation 1)}$$

Since the thermal expansion of steel members=thermal expansion of the aluminum member then $$K_1 L_1 \Delta t + K_1 L_1 \Delta t - K_2 L_2 \Delta t = 0$$

or, rewriting, $$2 K_1 L_1 = K_2 L_2 \quad \text{(Equation 2)}$$

where $\Delta t$ is the temperature change; $K_1$ and $K_2$ are coefficients of linear thermal expansion of steel and aluminum respectively.

Let $K_1/K_2 = R$ (less than one-half)

Then the solution of the Equations 1 and 2 gives:

$$L_1 = \frac{L_0}{2}\left(\frac{1}{1-R}\right) \quad \text{(Equation 3)}$$

and $$L_2 = 2RL_1 = L_0\left(\frac{R}{1-R}\right) \quad \text{(Equation 4)}$$

Hence a length relation is established for steel and aluminum or for other metals of convenient K values where the ratio R is preferably less than one-half.

Taking for example, $K_1 = 5.50 \times 10^{-6/F}$ $$K_2 = 12.1 \times 10^{-6/F}$$

i.e., $R = 5/11$

Then $L_1 = \frac{11}{12} \cdot L_0$ and $$L_2 = \frac{5}{6} \cdot L_0$$

so that if $L_0$ is 120 units:

$$L_1 = 110$$

and $$L_2 = 100$$

In use, the K value must be accurately evaluated for each of the metals to be used because of variations in such metals and after assembly the device must be standardized and adjusted to attain the degree of precision required. This adjustment can be accomplished by turning the aluminum sleeve within the bushing 13 and once this has been accomplished, the sleeve can be locked to the bushing and to the tube by means of lock screw 22.

It is obvious that any combination of metals may be used provided that the material of the inner sleeve has a higher coefficient of linear thermal expansion than does the material of the outer tube or rod, it is preferred, however, that the coefficient of expansion for the sleeve be at least twice as much as that for the outer tube and the rod.

Once the coefficients of linear thermal expansion are known and the overall length of the device is established, it is then possible to determine the lengths of the three components by substituting these values in the above equations.

Such a device as disclosed herein has many uses. One such use is as a convenient measurement standard, for example, a standard meter. The present standard for a meter is the international prototype meter which is maintained by the International Bureau of Weights and Measures in a constant temperature environment so as to preclude any changes in its lengthwise dimension. This device, dimensioned so as to be equal in length to the international prototype meter or some other standard of length, would maintain that precise length despite fluctuations in its temperature. For increased precision the ends 23 and 24 of the device are rounded as shown in the figure with the radius of curvature being equal to one-half the overall length of the device thereby insuring any straight line measurement from end 23 to end 24 will be equal to the overall length of the device.

A device having this unique property is also useful as a constant length pendulum arm of a pendulum clock. Variations in the length of the pendulum arm move the pendulum weight toward or away from the pivot point thereby varying the speed of the pendulum cycle. An arm not subject to these temperature-induced changes in length would have a constant pendulum cycle and would be more accurate in recording the passage of time. Other uses such as suspension frames for large optical mirrors used in telescopes or any structural elements where it is important to maintain a constant length will be obvious to those skilled in the art.

The invention described in detail in the foregoing specification is susceptable to changes and modifications as may occur to persons skilled in the art without departing from the principle and spirit thereof.

I claim:

1. A device constructed so as to maintain its length constant despite changes in its temperature comprising, a tube open at at least one end, a sleeve located within said tube having one end thereof fixedly connected to the open end of said tube and being shorter in length than the overall length of said tube, a rod positioned within said sleeve and having a portion thereof extending beyond the end of said sleeve and said tube, said rod fixedly connected to the opposite end of said sleeve located within said tube, said rod and said tube being of equal effective length and of the same metal, said sleeve being of a metal having a coefficient of linear thermal expansion substantially twice that of said tube and said rod and adapted to change in overall length for a change in temperature the same length as the combined changes in length of said tube and said rod due to the same change in temperature, with the change in length of the sleeve being in a direction opposite to the direction of the change in length of said tube and rod, means fixedly connecting said tube to the sleeve, and separate means fixedly connecting said sleeve at its opposite end to the rod, both said means being of the same metal and serving to suspend the remainder of said sleeve within and free from contact with said tube, and to suspend the remainder of said rod within said sleeve free from contact with said sleeve.

2. A device constructed so as to maintain its length constant despite changes in temperature comprising, a tube open and free on at least one end, a sleeve located within said tube having one end thereof fixedly connected to the open end of said tube and being shorter in length than the overall length of said tube, a rod positioned within said sleeve and having a portion thereof extending beyond the end of said sleeve and said tube, said rod fixedly connected to the opposite end of said sleeve located within said tube, said rod and said tube being of equal effective length, said sleeve being of a metal having a higher coefficient of linear thermal expansion than said tube and said rod and adapted to change in overall length in an opposite direction for a change in temperature the same length as the combined changes in length of said tube and said rod due to the same change in temperature, a threaded bushing fixedly connecting and maintaining in spaced relation said tube and said sleeve and a threaded bushing fixedly connecting and maintaining in spaced relation said sleeve and said rod, said bushing having a coefficient of linear thermal expansion intermediate between the coefficients of said tube and said sleeve.

3. A device according to claim 2 wherein said tube and said rod are composed of the same metal and said sleeve is composed of a different metal.

4. A device according to claim 3 wherein said tube and rod are composed of steel, said sleeve is composed of aluminum and said bushings are composed of brass.

References Cited

UNITED STATES PATENTS

| 315,527 | 4/1885 | Maillé | 58—133 |
| 334,958 | 1/1886 | Mahony | 58—133 |

FOREIGN PATENTS

| 897,227 | 11/1953 | Germany. |
| 9,358 | 1885 | Great Britain. |

OTHER REFERENCES

Watson, W.: A Text-Book of Physics, London, Longmans, Green & Co., 1920, pp. 214–216.

Hausmann, E.: Physics, New York, D. Van Nostrand, 1946, pp. 234–238.

RICHARD B. WILKINSON, *Primary Examiner.*

STANLEY A. WAL, *Assistant Examiner.*